(12) United States Patent
Sato et al.

(10) Patent No.: US 11,886,640 B2
(45) Date of Patent: Jan. 30, 2024

(54) OPERATION DEVICE

(71) Applicant: ALPS ALPINE CO., LTD., Tokyo (JP)

(72) Inventors: Kunio Sato, Miyagi (JP); Hiroshi Wakuda, Miyagi (JP); Shinichi Sagawai, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 15 days.

(21) Appl. No.: 17/806,141

(22) Filed: Jun. 9, 2022

(65) Prior Publication Data

US 2022/0300078 A1 Sep. 22, 2022

Related U.S. Application Data

(63) Continuation of application No. PCT/JP2020/041964, filed on Nov. 10, 2020.

(30) Foreign Application Priority Data

Dec. 27, 2019 (JP) .................. 2019-239842

(51) Int. Cl.
*G06F 3/01* (2006.01)
*G06F 3/041* (2006.01)
*G10K 15/04* (2006.01)

(52) U.S. Cl.
CPC .............. *G06F 3/016* (2013.01); *G06F 3/041* (2013.01); *G10K 15/04* (2013.01)

(58) Field of Classification Search
CPC .......... G06F 3/016; G06F 3/041; G10K 15/04
See application file for complete search history.

(56) References Cited

U.S. PATENT DOCUMENTS

2007/0097073 A1 5/2007 Takashima et al.
2012/0062491 A1* 3/2012 Coni .................. G06F 3/03547
345/173

(Continued)

FOREIGN PATENT DOCUMENTS

JP 2007-122501 5/2007
JP 2012-064210 3/2012

(Continued)

OTHER PUBLICATIONS

International Search Report for PCT/JP2020/041964 dated Dec. 15, 2020.

*Primary Examiner* — Peter D McLoone
(74) *Attorney, Agent, or Firm* — IPUSA, PLLC

(57) ABSTRACT

An operation device includes a movable part having an operating surface on which a contact operation is performed by an living body, a vibration exciter attached to the movable part at a position other than the operating surface, and configured to excite the movable part in a first direction along the operating surface, and in a second direction intersecting the operating surface, a base part, and an elastic support, provided between the movable part and the base part, and configured to elastically support the movable part with respect to the base part. The movable part provides a tactile sensation to the living body making the contact operation when excited in the first direction by the vibration exciter, and generates a sound from the operating surface when excited in the second direction by the vibration exciter.

8 Claims, 12 Drawing Sheets

(56) References Cited

U.S. PATENT DOCUMENTS

| | | | |
|---|---|---|---|
| 2015/0277562 A1* | 10/2015 | Bard | ............... G06F 3/016 345/177 |
| 2018/0081446 A1 | 3/2018 | Wakuda | |
| 2019/0056787 A1 | 2/2019 | Matsumoto | |
| 2020/0079400 A1 | 3/2020 | Jeno | |

FOREIGN PATENT DOCUMENTS

| | | |
|---|---|---|
| JP | 2016-096677 | 5/2016 |
| JP | 2018-097706 | 6/2018 |
| JP | 2019-036144 | 3/2019 |
| WO | 2017/010171 | 1/2017 |

\* cited by examiner

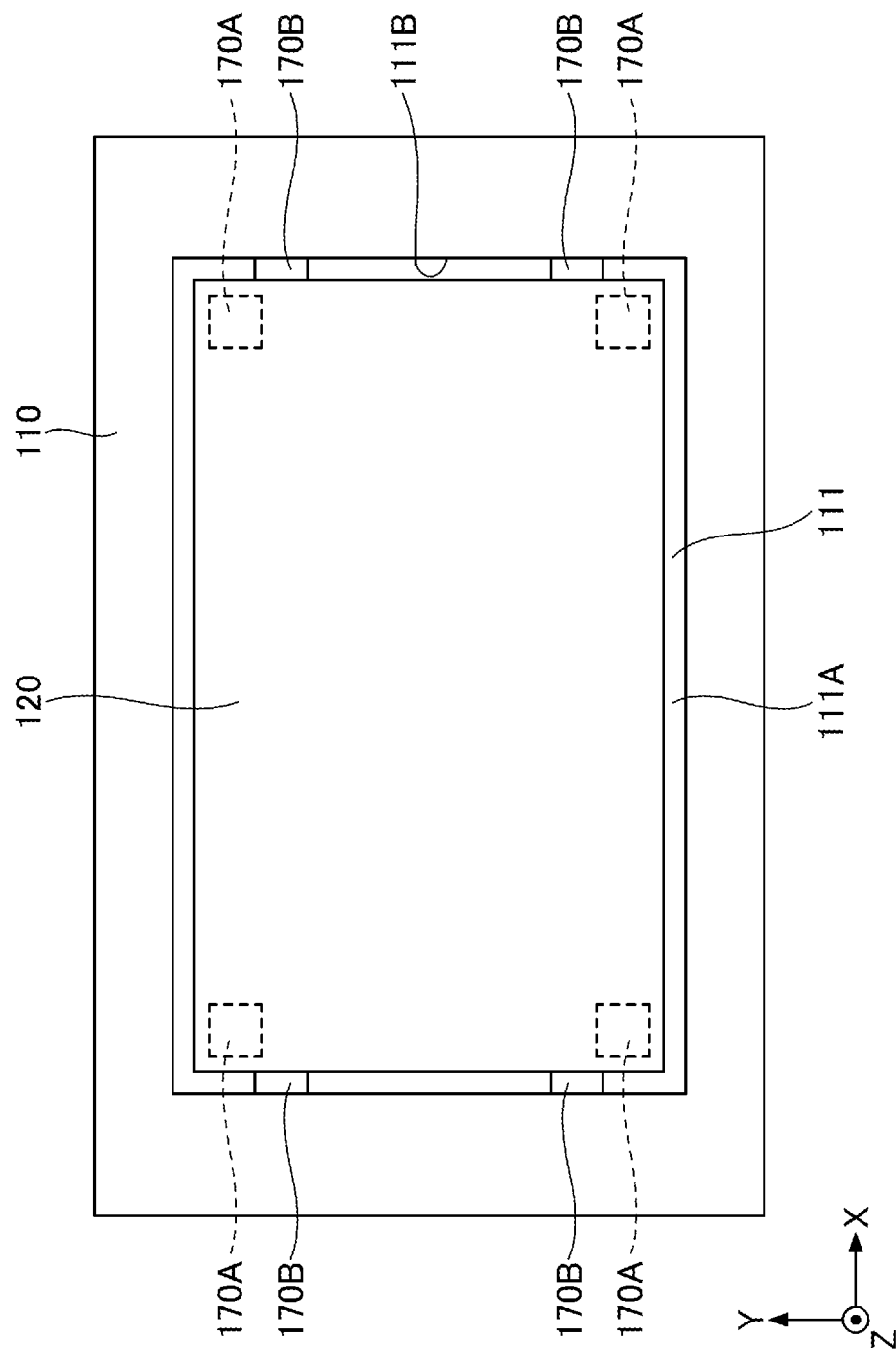

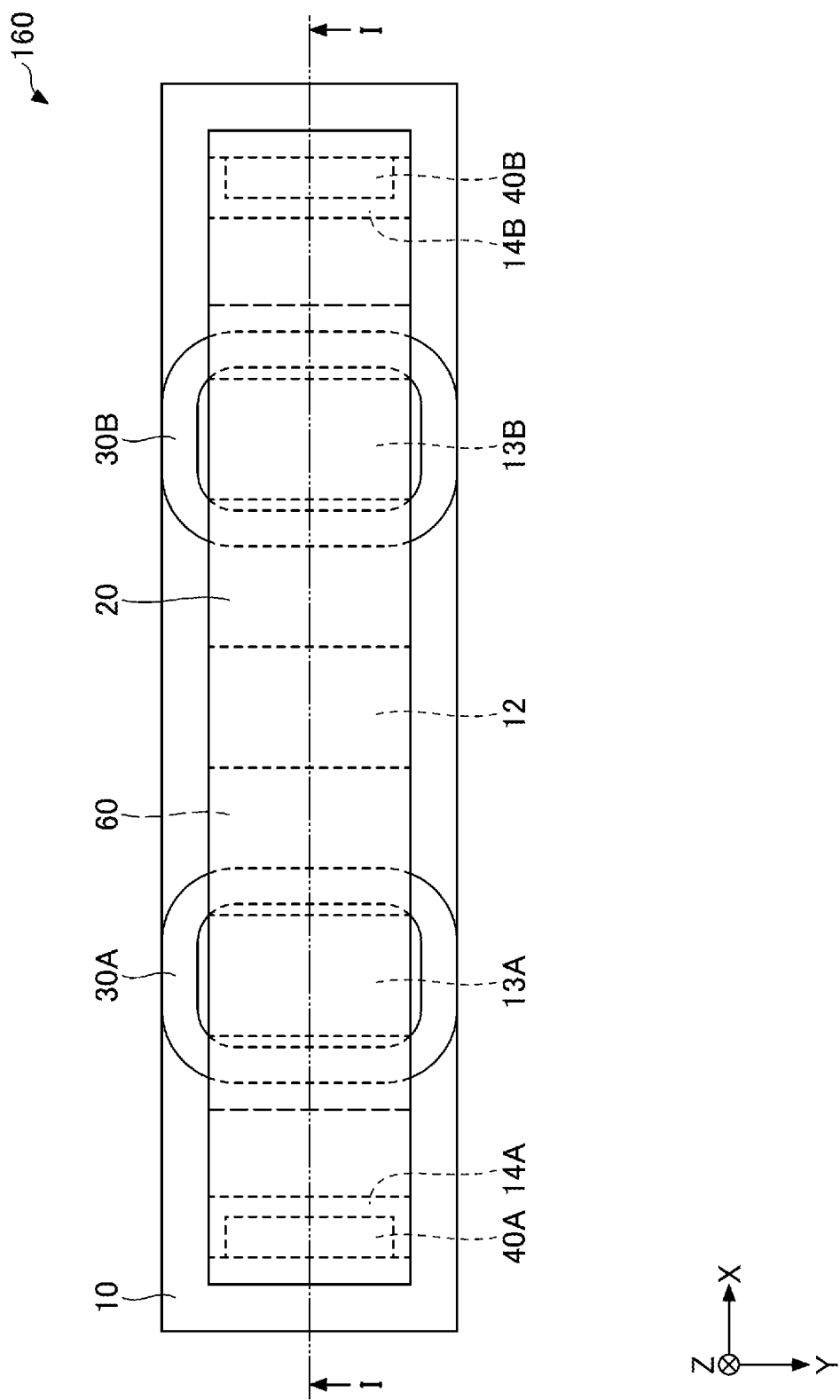

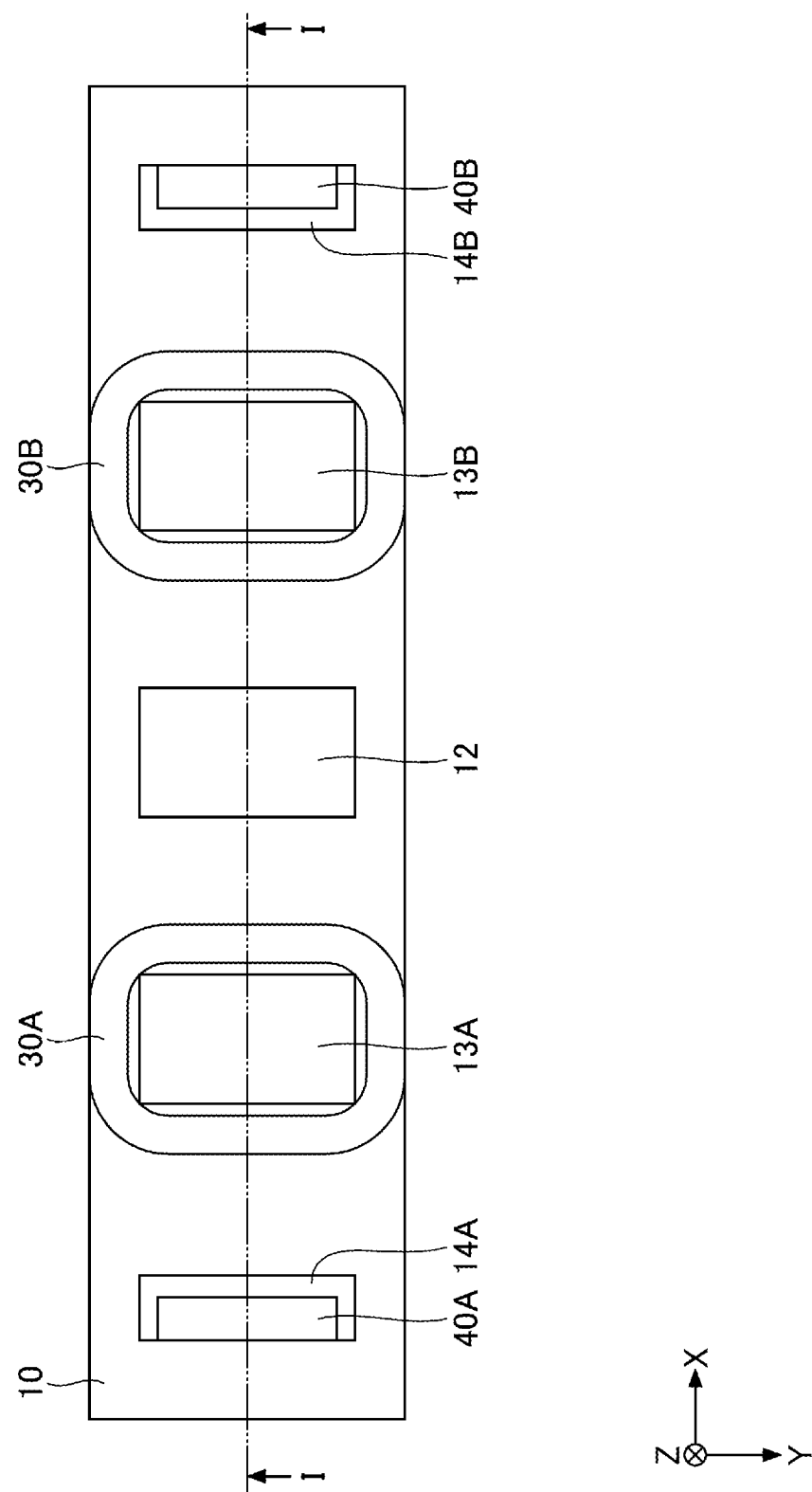

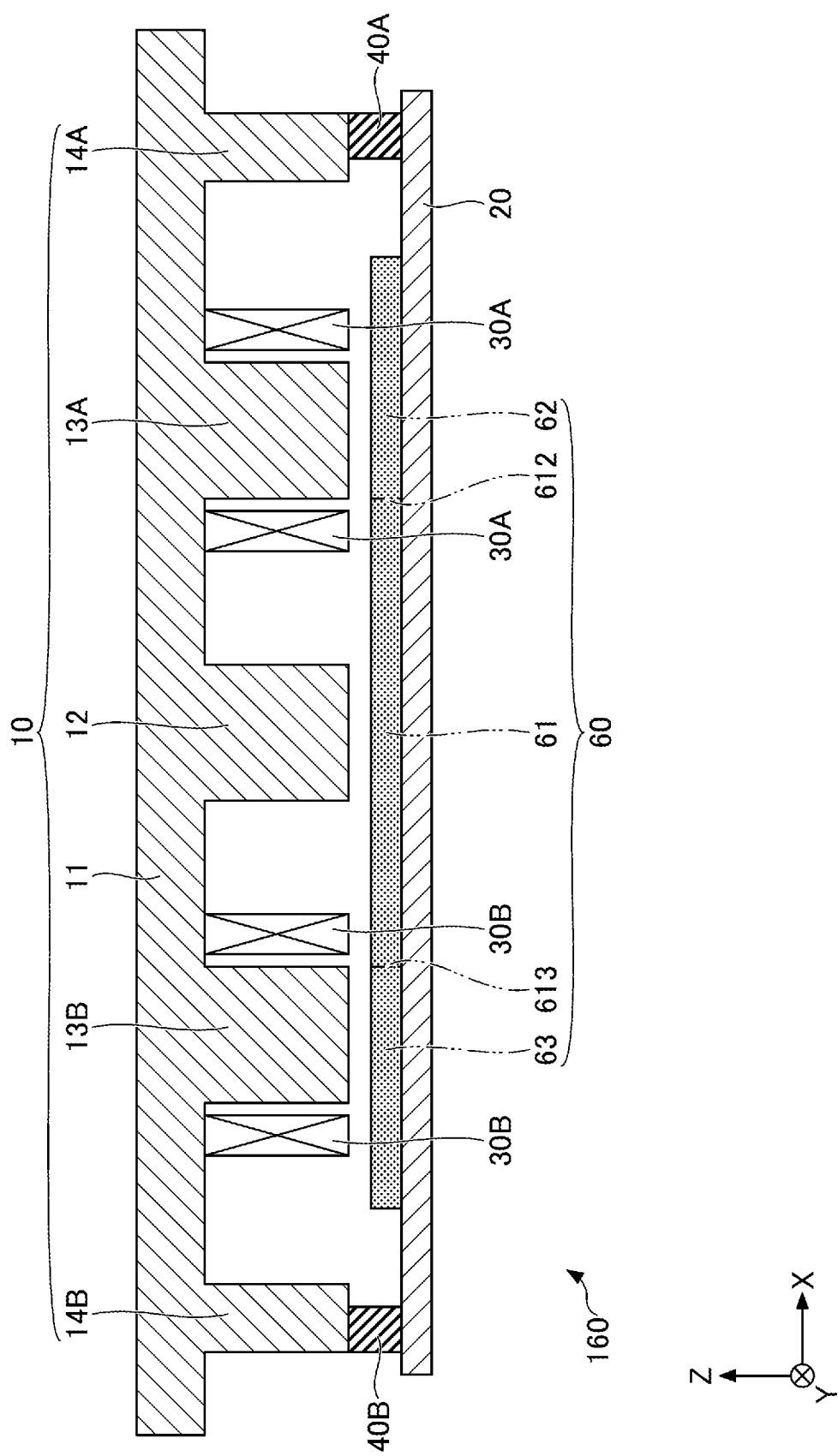

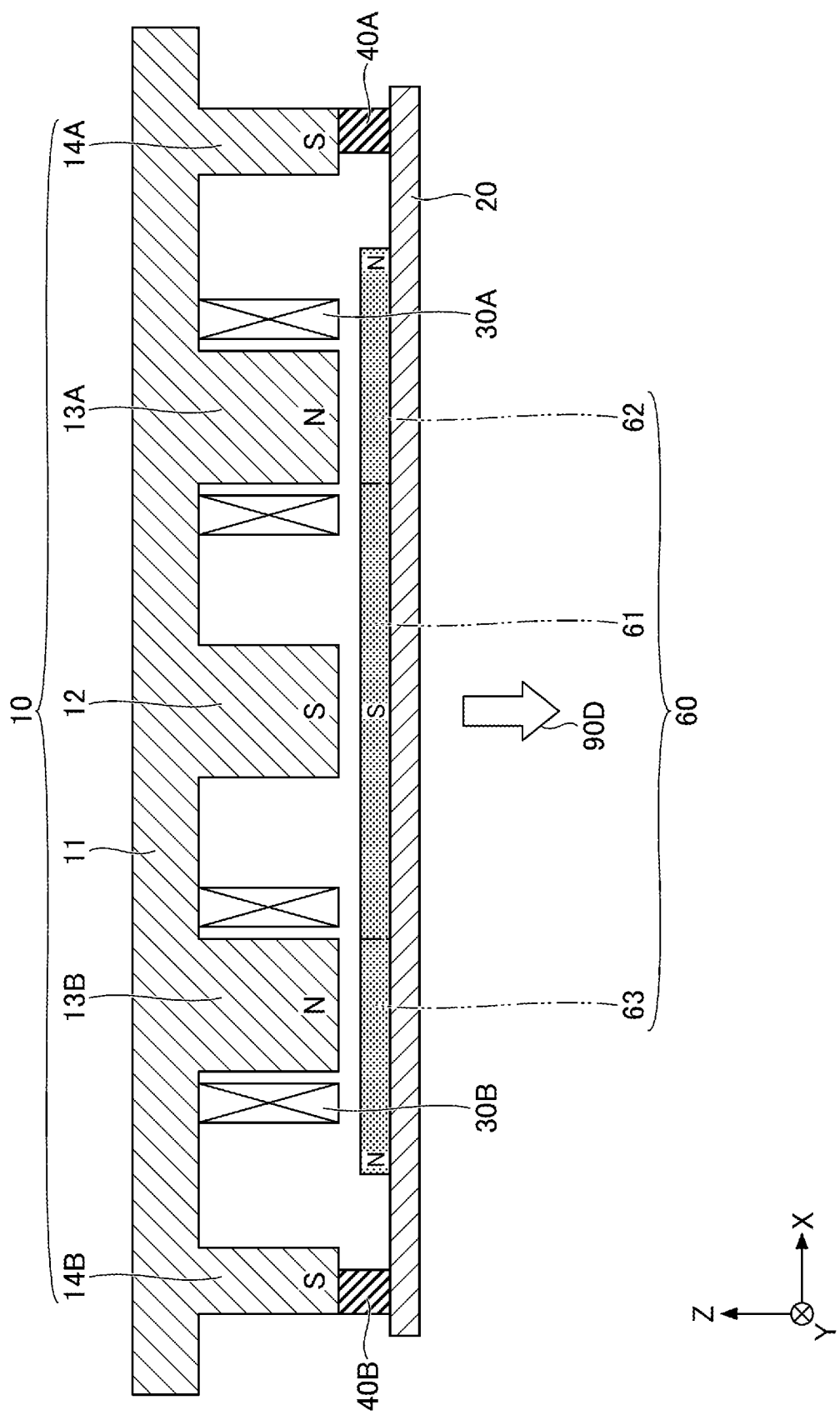

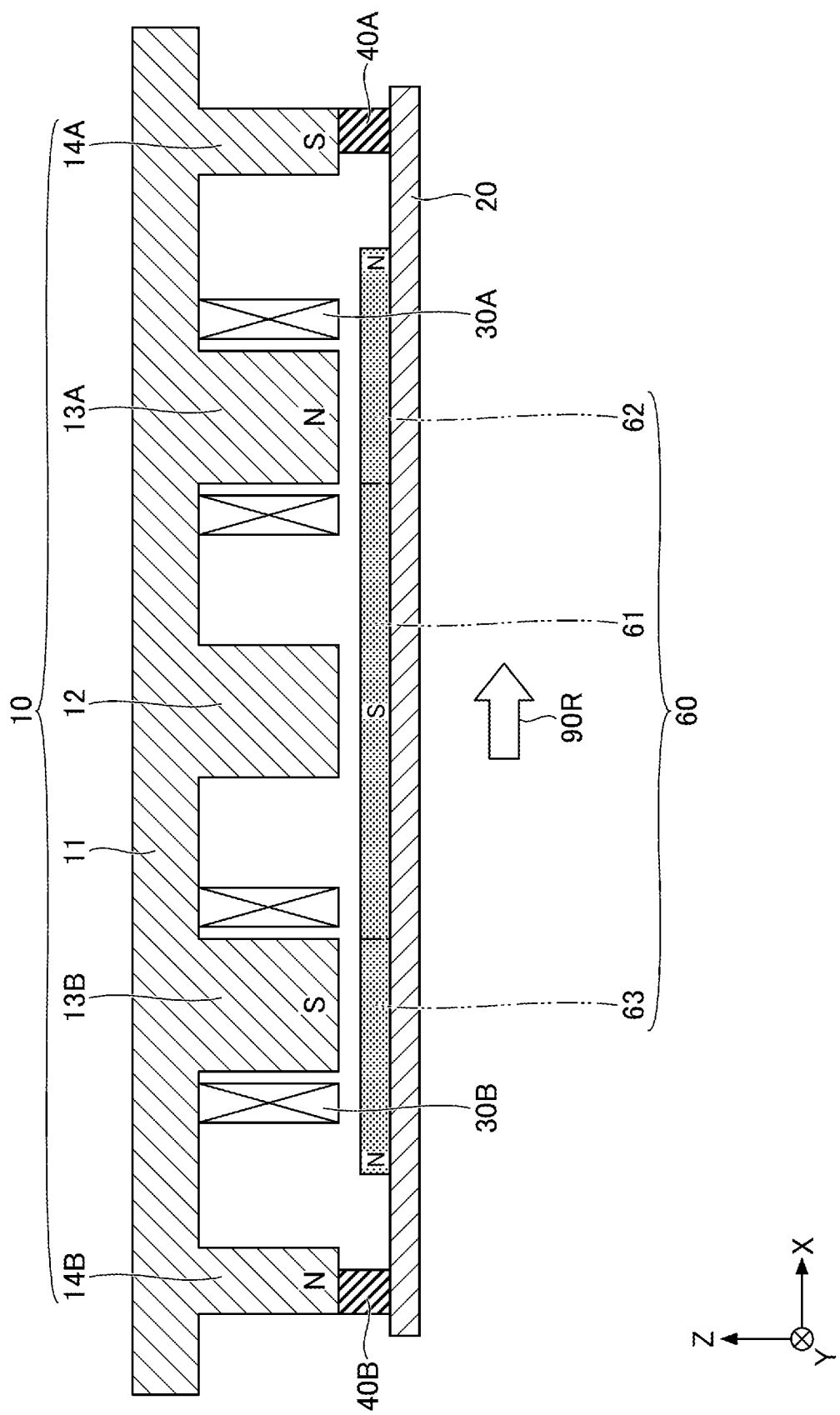

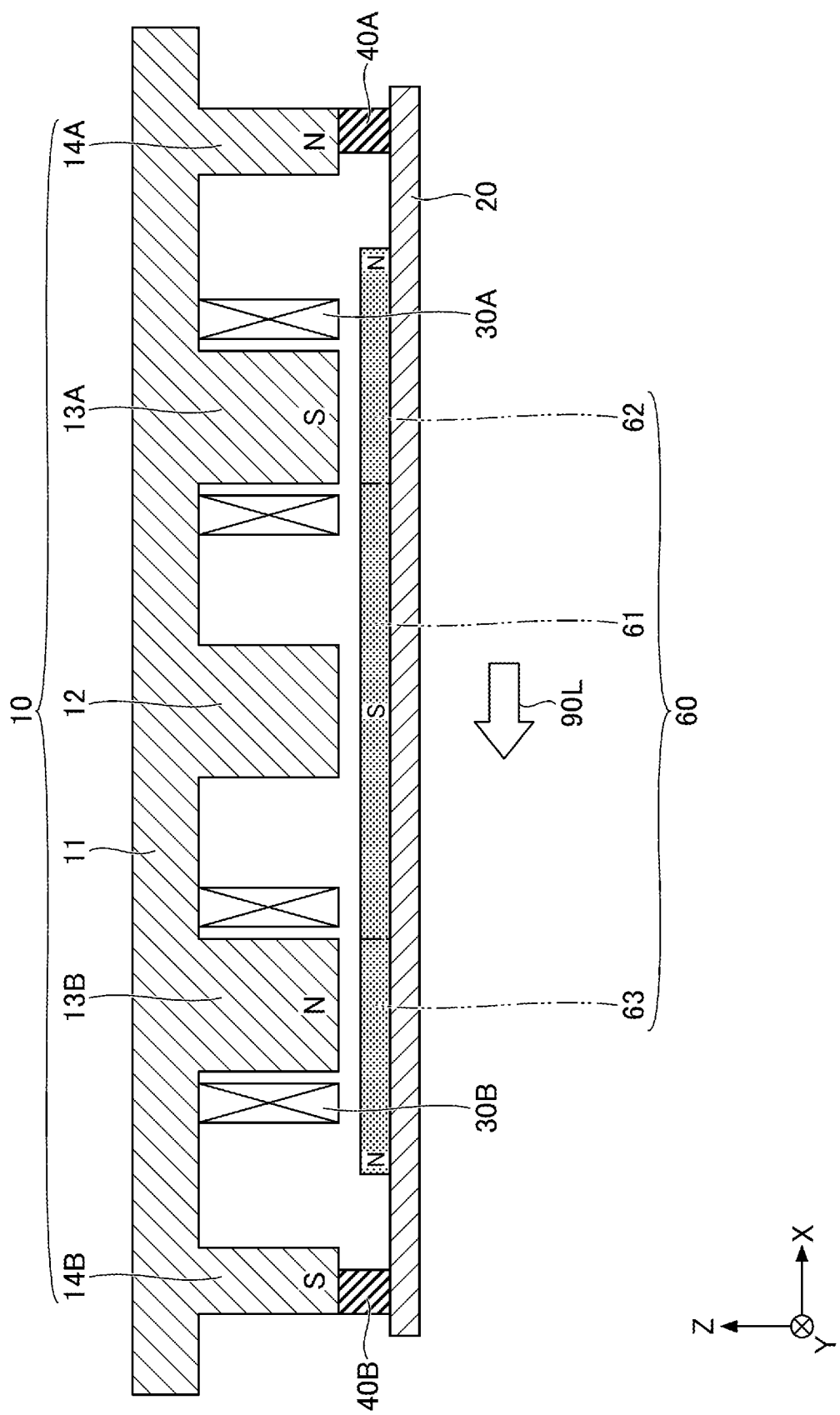

OPERATION DEVICE

CROSS-REFERENCE TO RELATED APPLICATIONS

This application is a continuation application of International Application No. PCT/JP2020/041964 filed on Nov. 10, 2020 and designated the U.S., which is based upon and claims priority to Japanese Patent Application No. 2019-239842, filed on Dec. 27, 2019, the entire contents of which are incorporated herein by reference.

BACKGROUND OF THE INVENTION

1. Field of the Invention

The present disclosure relates to operation devices.

2. Description of the Related Art

Conventionally, there is a tactile and auditory sense presentation device provided with an actuator that imparts vibration to an operating surface on which an operation is performed, a sound output unit that outputs sound, and a controller that presents a cross modal feedback by controlling the actuator to apply the vibration to the operating surface and controlling the sound output unit to output the sound at a timing when vibration is presented (for example, refer to Japanese Laid-Open Patent Publication No. 2018-097706).

In the conventional tactile and auditory sense presentation device, the actuator that generates the vibration for presenting a sensation (a tactile sensation) to an operator through a tactile sense, and the sound output unit that outputs the sound for presenting a sensation through an auditory sense, are separate devices. For this reason, when the sound representing the vibration from the actuator is output from the sound output unit, a large difference is introduced between the tactile sense and the auditory sense with respect to an operation, due to positions of the actuator and the sound output unit that are different.

SUMMARY OF THE INVENTION

Accordingly, one object of the present disclosure is to provide an operation device that can provide a natural operation feeling through a tactile sense and an auditory sense.

An operation device according to one aspect of the present disclosure includes a movable part having an operating surface on which a contact operation is performed by an living body; a vibration exciter attached to the movable part at a position other than the operating surface, and configured to excite the movable part in a first direction along the operating surface, and in a second direction intersecting the operating surface; a base part; and an elastic support, provided between the movable part and the base part, and configured to elastically support the movable part with respect to the base part, wherein the movable part provides a tactile sensation to the living body making the contact operation when excited in the first direction by the vibration exciter, and generates a sound from the operating surface when excited in the second direction by the vibration exciter.

Other objects and further features of the present invention will be apparent from the following detailed description when read in conjunction with the accompanying drawings.

BRIEF DESCRIPTION OF THE DRAWINGS

FIG. 3 is a plan view illustrating a state where a touchpad 130 and a frame 150 are omitted;

FIG. 4 is a plan view illustrating a configuration of an actuator 140;

FIG. 5 is a plan view omitting a movable yoke and a permanent magnet from FIG. 4;

FIG. 6 is a cross sectional view illustrating the configuration of the actuator 140;

FIG. 7A is a diagram illustrating a relationship between a direction of current and a direction of motion in a first combination;

FIG. 7C is a diagram illustrating the relationship between the direction of current and the direction of motion in a third combination;

FIG. 7D is a diagram illustrating the relationship between the direction of current and the direction of motion in a fourth combination;

DESCRIPTION OF THE PREFERRED EMBODIMENTS

Hereinafter, embodiments applied with the operation device according to the present invention will be described.

Figure 1:
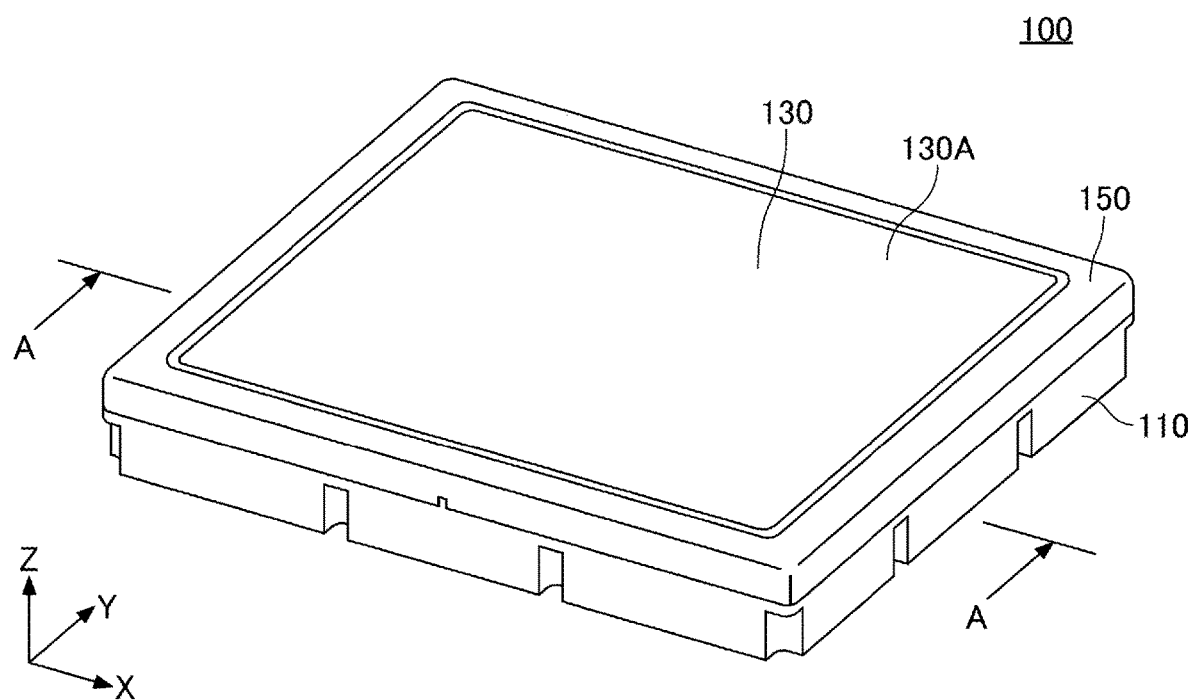
FIG. 1 is a perspective view illustrating an operation device 100 according to one embodiment.
Figure 2:
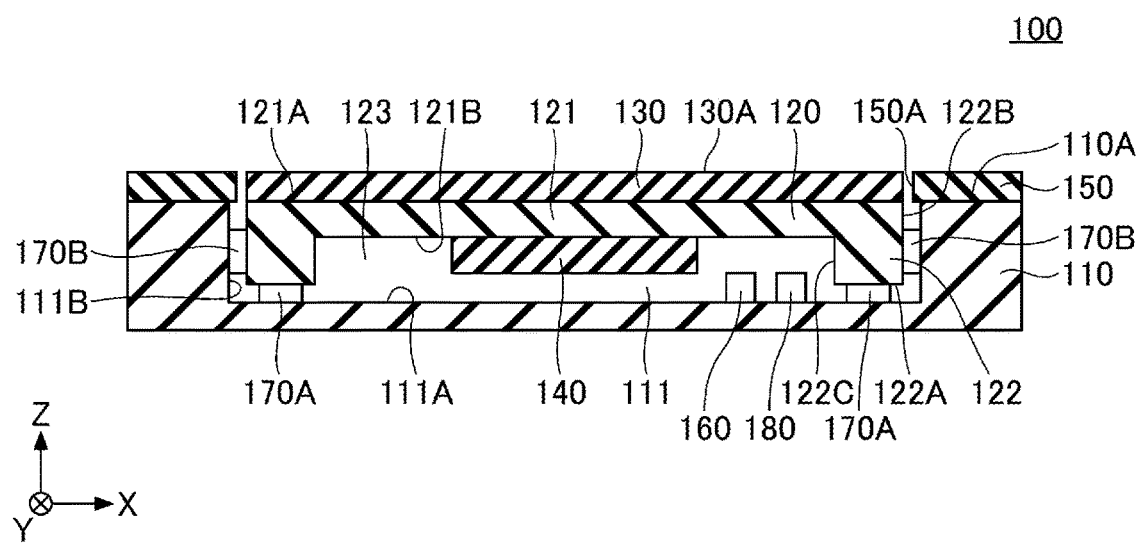
FIG. 2 is a cross sectional view along a line A-A in FIG. 1.

FIG. 1 is a perspective view illustrating the operation device 100 according to one embodiment. FIG. 2 is a cross sectional view along a line A-A in FIG. 1. An XYZ coordinate system will be defined and described below. Hereinafter, for the sake of convenience, a plan view refers to a view of an XY-plane, and a negative Z-axis direction refers to a downward or lower direction, and a positive Z-axis direction refers to an upward or upper direction, but such directions do not represent a universal vertical relationship.

The operation device 100 includes a base 110, a holder 120, a touchpad 130, an actuator 140, a frame 150, a gap sensor 160, dampers 170A and 170B, and a controller 180. Hereinafter, a description will be given by referring to FIG. 3, in addition to FIG. 1 and FIG. 2. FIG. 3 is a plan view illustrating a state where the touchpad 130 and the frame 150 are omitted.

Here, when a pressing operation on an operating surface 130A of the touchpad 130 is detected by the gap sensor 160, the operation device 100 drives the actuator 140 to excite the holder 120 and the touchpad 130 in an X-direction and a Z-direction.

The operation device 100 drives the actuator 140 to excite the holder 120 and the touchpad 130 in the X-direction when providing a tactile sensation to a living body that performs a touch operation on the operating surface 130A, and drives the actuator 140 to excite the holder 120 and the touchpad 130 in the Z-direction when generating a sound for presenting the sound to the living body or the like. The living body performs the touch operation while keeping an operating body touching the operating surface 130A. The operation device 100 provides the tactile sensation to the living body through the operating body touching the operating surface 130A. The operating body may be a hand or finger of the living body making the touch operation on the operating surface 130A to perform the operation, a glove worn on the hand of the living body, a tool such as a stylus held by the hand of the living body, or the like, and the operating body enables the touchpad 130 to detect the touch to the operating surface 130A. The touch operation refers to an operation that is performed in a state where the operating body touches the operating surface 130A of the touchpad 130. The living body is typically a human being. The tactile sensation refers to a sensation felt by the living body through a tactile sense.

The operation device 100 simulates a tactile sensation and a sound of a push button switch that is operated, when the push button switch uses a metal dome made from a sheet metal that is famed into a dome shape, for example. When a pressing operation is performed on the touchpad 130, the actuator 140 is driven to excite the holder 120 and the touchpad 130, so as to provide a tactile sensation felt when a real push button switch is operated and a sound similar to those. The tactile sensation and the sound simulated by the operation device 100 are not limited to those of such a push button switch, and a tactile sensation and a sound of various switches may be presented. The tactile sensation and the sound presented by the operation device 100 are not limited to those simulating the push button switch or the like. Hereinafter, a configuration of each part of the operation device 100 will be described.

The base 110 is an example of a base part, and forms a case of the operation device 100 together with the frame 150. The base 110 in this example has a rectangular shape in the plan view, and has an accommodating part 111 that is recessed downward at a center portion of an upper surface 110A. The accommodating part 111 in this example has a rectangular shape in the plan view. The base 110 has a bottom surface 111A and four inner surfaces 111B at parts facing the accommodating part 111. The accommodating part 111 is a recess part defined by the bottom surface 111A and the four inner surfaces 111B.

The holder 120, the actuator 140, the gap sensor 160, the dampers 170A and 170B, and the controller 180 are accommodated in the accommodating part 111. Among the accommodated elements, the gap sensor 160 and the controller 180 are fixed to the bottom surface 111A. The base 110 is made of a resin, for example.

The holder 120 and the touchpad 130 are examples of a movable part. The holder 120 may be formed integrally with the touchpad 130, but in the described example, the holder 120 is separate from the touchpad 130.

The holder 120 has a base part 121 and a wall part 122. The base part 121 is a plate shaped member, and the wall part 122 is a member having a rectangular annular shape extending downward from a lower surface of the base part 121. The base part 121 and the wall part 122 have the same external dimensions in the plan view. The holder 120 is made of a resin, for example.

The base part 121 has an upper surface 121A, and a lower surface 121B. The touchpad 130 is fixed to the upper surface 121A, and the actuator 140 is fixed to the lower surface 121B. The wall part 122 includes a lower surface 122A, an outer surface 122B, and an inner surface 122C. The shape of the wall part 122 is not necessarily limited to the rectangular annular shape. The wall part 122 may include two wall parts extending along the Y-direction, at ends on the +X-direction side and the −X-direction side of the base part 121, for example.

The holder 120 is provided inside the accommodating part 111 of the base 110, and is elastically supported with respect to the base 110 through the dampers 170A and 170B. The damper 170A is provided between the lower surface 122A of the wall part 122 and the bottom surface 111A of the base 110, and the damper 170B is provided between the outer surface 122B of the wall part 122 and the inner surface 111B of the base 110.

The accommodating part 111 is a space having a rectangular shape surrounded by the lower surface 121B of the base part 121 and the inner surface 122C of the wall part 122. The actuator 140 is accommodated inside the housing 123 in a state attached to the lower surface 121B of the base part 121.

The touchpad 130 is an electrostatic capacitance type touchpad, for example. The touchpad 130 may be of a type other than the electrostatic capacitance type touchpad. The touchpad 130 is plate shaped member having a rectangular shape in the plan view, and external dimensions of the touchpad 130 are the same as those of the holder 120 in the plan view. The touchpad 130 is fixed by bonding a lower surface thereof to an upper surface of the holder 120 (that is, the upper surface 121A of the base part 121). An upper surface of the touchpad 130 is the operating surface 130A on which the touch operation is performed by the living body. A panel having the operating surface 130A is made of glass or acrylic resin.

The touchpad 130 preferably has a stiffness that is high to an extent such that, when excited in the X-direction by the actuator 140 and vibrated, an acceleration excited in the Z-direction is ¼ of an acceleration excited in the X-direction or less. Accordingly, because generation of undesired vibration components in the Z-direction can be reduced when vibrating in the X-direction to provide the tactile sensation, it is possible to reduce generation of undesired noise and provide an excellent tactile sensation.

The actuator 140 is an example of a vibration exciter, and is fixed to the lower surface 121B of the base part 121 of the holder 120 by bonding, screws, or the like. A thickness of the actuator 140 in the Z-direction is less than a sum of a thickness of the wall part 122 of the holder 120 in the Z-direction, and a thickness of the damper 170A in the Z-direction. Because the damper 170A is an elastic member, the damper 170A expands and contracts in the thickness direction (Z-direction) when the actuator 140 excites the holder 120. However, even in a state where the damper 170A is in a most contracted state, a relationship in which the thickness of the actuator 140 in the Z-direction is less than the sum of the thickness of the wall part 122 of the holder 120 in the Z-direction, and the thickness of the damper 170A in the Z-direction. For this reason, the lower surface of the actuator 140 is separated from the bottom surface 111A of the base 110 in the Z-direction, so as to make it difficult for the vibration of the actuator 140 to be transmitted to the base 110. The actuator 140 may be configured to make contact with both the bottom surface 111A of the base 110, and the lower surface 121B of the holder 120, when the vibration may propagate or is to propagate to the base 110.

The actuator 140 can excite the holder 120 and the touchpad 130 in the X-direction and the Z-direction. The actuator 140 may be attached anywhere on external surfaces of the holder 120 and the touchpad 130 which are movable parts, other than on the operating surface 130A of the holder 120, provided that the holder 120 and the touchpad 130 can be excited in the X-direction and the Z-direction.

The X-direction in which the actuator 140 excites the holder 120 and the touchpad 130, is an example of a first direction along the operating surface 130A, and the Z-direction in which the actuator 140 excites the holder 120 and the touchpad 130, is an example of a second direction intersecting the operating surface 130A.

Here, an example will be described in which the actuator 140 excites the holder 120 and the touchpad 130 in the X-direction and the Z-direction, thereby vibrating the holder 120 and the touchpad 130 in the X-direction and the Z-direction. However, a direction (first direction) in which the actuator 140 excites the holder 120 and the touchpad 130 in order to provide the tactile sensation to the living body, is not limited to the X-direction, and may be any direction along the operating surface 130A. In other words, the direction (first direction) in which the actuator 140 excites the holder 120 and the touchpad 130 in order to provide the tactile sensation to the living body, may be along any direction included in the XY-plane including the operating surface 130A, and along any direction included in the XY-plane refers to cases where a slight angle is formed with respect to the X-direction due to a manufacturing error or the like.

In addition, a direction (second direction) in which the actuator 140 excites the holder 120 and the touchpad 130 in order to present the sound to the living body, is not limited to the Z-direction, and may be any direction that intersects the XY-plane including the operating surface 130A, at an angle greater than or equal to 45 degrees, for example. In this case, the closer the second direction is to the Z-direction, the easier it is to generate a large sound.

The frame 150 is fixed to the upper surface 110A of the base 110 by bonding or the like. The frame 150 has an opening edge 150A that defines an opening inside in the plan view. In this example, the frame 150 is a member having a rectangular annular picture-frame shape in the plan view, and has outer dimensions that are the same as those of the base 110 in the plan view. The frame 150 is made of a resin, for example. Moreover, in the plan view, interior dimensions of the opening edge 150A of the frame 150 may be smaller than interior dimensions of the inner surface 111B of the base 110. In other words, a gap between the opening edge 150A of the frame 150 and the touchpad 130 may be less than a gap between the inner surface 111B of the base 110 and the outer surface 122B of the holder 120. Hence, it is possible to improve an external appearance, by making the damper 170B uneasily visible in the plan view.

The gap sensor 160 is an example of a detector that detects the pressing operation on the operating surface 130A, and is fixed to the bottom surface 111A of the base 110. A position of the gap sensor 160 in the plan view is on an inner side of the inner surface 122C of the wall part 122 of the holder 120, for example, and does not overlap the actuator 140.

The gap sensor 160 is an optical type sensor that includes a light source and a light receiving element, for example, and receives light irradiated onto and reflected from the lower surface 121B of the base part 121 of the holder 120. The gap sensor 160 detects a displacement of the base part 121 of the holder 120 in the −Z-direction, based on a change in a position where the reflected light is imaged on the light receiving element. When the base part 121 of the holder 120 is displaced in the −Z-direction, the touchpad 130 is also displaced in the −Z-direction. Thus, by detecting the displacement of the base part 121 in the −Z-direction, it is possible to detect the pressing of the touchpad 130 in the −Z-direction. When the touchpad 130 is pressed in the −Z-direction, the base part 121 of the holder 120 and the touchpad 130 are displaced by several tens of μm in the −Z-direction.

The detector that detects the pressing operation on the operating surface 130A is not limited to the gap sensor 160. The detector may be a non-contact position sensor, such as an electrostatic sensor or the like. The detector may be a pressure sensor that detects a pressure applied to the operating surface 130A.

The dampers 170A and 170B are examples of elastic supports, and are elastic members. The dampers 170A and 170B are made of rubber, for example, and are rubber masses. The dampers 170A and 170B are not limited to the rubber masses, and may be configured to include springs, for example. However, because it is unpreferable for the damper 170A or the damper 170B to generate sound, the damper is more preferably made of rubber than being configured to include a metal spring or the like.

The damper 170A is an example of a second elastic body that elastically supports the holder 120 along the Z-direction. The damper 170A is provided between the lower surface 122A of the wall part 122 of the holder 120, and the bottom surface 111A of the base 110, and is fixed by bonding, screws, or the like. In the example illustrated in FIG. 3, four dampers 170A are provided so as to be positioned at four corners of the holder 120 in the plan view.

The dampers 170A elastically support the holder 120 with respect to the bottom surface 111A of the base 110. The dampers 170A are provided to suitably vibrate the holder 120 and the touchpad 130 in the X-direction and the Z-direction, by cooperating with the dampers 170B.

The damper 170B is an example of a first elastic body that elastically supports the holder 120 along the X-direction. The damper 170B is provided between the outer surface 122B of the wall part 122 of the holder 120, and the inner surface 111B of the base 110, and is fixed by bonding, screws or the like. In the example illustrated in FIG. 3, two dampers 170B are provided between the outer surface 122B and the inner surface 111B at positions separated in the Y-direction on the +X-direction side of the holder 120, and two dampers 170B are provided between the outer surface 122B and the inner surface 111B at positions separated in the Y-direction on the −X-direction side of the holder 120. One damper 170B, or three or more dampers 170B, may be provided on each of the +X-direction side and the −X-direction side of the holder 120, and the number of dampers 170B provided on the +X-direction side of the holder 120 and the number of dampers 170B provided on the −X-direction side of the holder 120 may be different.

The damper 170B is provided between the base 110 and the holder 120 as described above, to elastically support the holder 120 with respect to the base 110. The dampers 170B are provided to suitably vibrate the holder 120 and the touchpad 130 in the X-direction and the Z-direction, by cooperating with the dampers 170A.

A first natural frequency and a second natural frequency are determined by the positions of the dampers 170A and the dampers 170B with respect to the holder 120, a combined spring constant in the Z-direction of the damper 170A and the damper 170B, and a weight, a Young's modulus, or the like of the holder 120, the touchpad 130, and the actuator 140, respectively.

The natural frequency in the Z-direction of the holder 120 and the touchpad 130 is set higher than the natural frequency in the X-direction. In other words, the dampers 170A and the dampers 170B, as the elastic supports, elastically support the holder 120, so that a natural frequency in the Y-direction (hereinafter referred to as a "second natural frequency", as appropriate) of the holder 120 and the touchpad 130, as the movable parts, is larger than a natural frequency in the X-direction (hereinafter referred to as "a first natural frequency", as appropriate). In addition, the natural frequency of the holder 120 and the touchpad 130 is proportional to the combined spring constant of the damper 170A and the damper 170B, as the elastic supports, to the power ½, in a case where the holder 120 and the touchpad 130 are assumed to be rigid bodies. For this reason, when the combined spring constant in the Z-direction of the damper 170A and the damper 170B is set larger than the combined spring constant in the X-direction of the damper 170A and the damper 170B, the second natural frequency can easily be set higher than the first natural frequency.

The combined spring constant in the Z-direction of the damper 170A and the damper 170B is greatly affected by the damper 170A. On the other hand, the combined spring constant in the X-direction of the damper 170A and the damper 170B is greatly affected by the damper 170B. For this reason, when the spring constant in the Z-direction of the damper 170A is set larger than the spring constant in the X-direction of the damper 170B, the second natural frequency can easily be set higher than the first natural frequency. In order to set the spring constants of the damper 170A and the damper 170B to different values, it is possible (1) to make the damper 170A and the damper 170B have mutually different hardnesses by forming the damper 170A and the damper 170B from different materials, (2) have mutually different shapes (for example, because the spring constant becomes smaller as an area perpendicular to a supporting direction of the holder 120 becomes smaller, have shapes with different perpendicular areas, or have shapes with different thicknesses along the supporting direction of the holder 120), and (3) have different numbers of dampers 170A and dampers 170B provided, or the like.

In addition, the damper 170B is disposed in a state elastically deformed in the X-direction, between the outer surface 122B of the wall part 122 of the holder 120, and the inner surface 111B of the base 110. In other words, the damper 170B is disposed between the outer surface 122B of the wall part 122 of the holder 120, and the inner surface 111B of the base 110, in a state compressed in the X-direction than a natural length thereof. The natural length of the damper 170B refers to a length in the X-direction in a state where no stress is applied thereto.

The damper 170B is disposed between the outer surface 122B and the inner surface 111B, in the state elastically deformed in the X-direction for the following reasons. Because the holder 120 and the touchpad 130 vibrate in the X-direction, the damper 170B is disposed to exhibit a restoring force in a direction opposite to the direction of the vibration, so as not to make contact with the base 110 and the frame 150. In addition, the damper 170B is disposed to enable the holder 120 and the touchpad 130 to be restored to initial positions thereof in the plan view before being excited, when the excitation of the holder 120 and the touchpad 130 by the actuator 140 ends. Similarly, the damper 170A is disposed between the bottom surface 111A of the holder 120, and the lower surface 122A of the wall part 122 of the holder 120, in a state elastically deformed in the Y-direction.

A configuration in which the operation device 100 includes the dampers 170A and 170B will be described. However, in a case where the holder 120 and the touchpad 130 can be restored to the initial positions in the plan view before being excited, using only the dampers 170A, the dampers 170B may be omitted. Similarly, in a case where the holder 120 and the touchpad 130 can be restored to the initial positions in the view along the line A-A before being excited, using only the dampers 170B, the dampers 170A may be omitted.

The controller 180 drives and controls the actuator 140. Details of the controller 180 will be described later with reference to FIG. 8.

Next, the details of the actuator 140 will be described.

Next, an example of a configuration of the actuator 140 will be described. FIG. 4 is a plan view illustrating the example of the configuration of the actuator 140. FIG. 5 is a plan view of the actuator 140 illustrated in FIG. 4, omitting a moving yoke and a permanent magnet. FIG. 6 is a cross sectional view illustrating the configuration of the actuator 140. FIG. 6 corresponds to the cross sectional view along a line I-I in FIG. 4 and FIG. 5.

As illustrated in FIG. 4 through FIG. 6, the actuator 140 includes a stator yoke 10, a movable yoke 20, a first excitation coil 30A, a second excitation coil 30B, a first rubber 40A, a second rubber 40B, and a permanent magnet 60. The stator yoke 10 is an example of a constituent element forming a part of a stator body, and the movable yoke 20 is an example of a constituent element forming a part of a vibrating body. The first excitation coil 30A and the second excitation coil 30B are examples of coils, the first rubber 40A and the second rubber 40B are examples of elastic bodies, and the permanent magnet 60 is an example of a magnet. The stator yoke 10 has the plate shaped base 11 having the generally rectangular planar shape. The base 11 has a longitudinal direction along the X-direction, a short direction along the Y-direction, and a thickness direction along the Z-direction. Axial directions of the first excitation coil 30A and the second excitation coil 30B are parallel to the Z-direction. The movable yoke 20 is an example of a first yoke, the stator yoke 10 is an example of a second yoke, and the first rubber 40A and the second rubber 40B are examples of elastic supports. The X-direction is an example of a fourth direction, and the Z-direction is an example of a third direction. For example, the first direction and the fourth direction may be the same, and the second direction and the third direction may be the same.

The stator yoke 10 further has a center projection 12 projecting downward (−Z-direction) from a center of the base 11, a first side projection 14A projecting downward from an end on the +X-direction side along the longitudinal direction of the base 11, and a second side projection 14B projecting downward from an end on the −X-direction side along the longitudinal direction of the base 11. The first side projection 14A and the second side projection 14B are provided at positions sandwiching the center projection 12 along the X-direction. The stator yoke 10 further has a first iron core 13A projecting downward below the base 11 from a position between the center projection 12 and the first side projection 14A, and a second iron core 13B projecting downward below the base 11 from a position between the center projection 12 to the second side projection 14B. The first excitation coil 30A is wound around the first iron core 13A, and the second excitation coil 30B is wound around the second iron core 13B. The first rubber 40A is provided on the first side projection 14A, and the second rubber 40B is provided on the second side projection 14B. The center projection 12 is an example of a first projection, and the first side projection 14A and the second side projection 14B are examples of second projections.

The movable yoke 20 is plate shaped, and has a generally rectangular planar shape. The movable yoke 20 makes contact with the first rubber 40A and the second rubber 40B, at ends along the longitudinal direction thereof. The permanent magnet 60 is attached to a surface of the movable yoke 20 on a side facing the stator yoke 10. The permanent magnet 60 has a first region 61, a second region 62 located on the +X-direction side of the first region 61, and a third region 63 located on the −X-direction side of the first region 61. For example, the first region 61 is magnetized to become an S-pole, and the second region 62 and the third region 63 are magnetized to become N-poles. The permanent magnet 60 is attached approximately at a center of the movable yoke 20 in the plan view, so that the first region 61 opposes the center projection 12, a boundary 612 between the first region 61 and the second region 62 opposes the first excitation coil 30A, and a boundary 613 between the first region 61 and the third region 63 opposes the second excitation coil 30B. In addition, the boundary 612 is located at a position on the −X-direction side than a center axis of the first excitation coil 30A, and the boundary 613 is located at a position on the +X-direction side than the center axis of the second excitation coil 30B. In other words, the boundary 612 is located at a position on the −X-direction side than a center of the first iron core 13A, and the boundary 613 is located at a position on the +X-direction side than a center of the second iron core 13B. The permanent magnet 60 magnetizes the stator yoke 10 and the movable yoke 20, so as to urge the movable yoke 20 in a direction toward the stator yoke 10 along the Z-direction, by a magnetic attraction force. Moreover, due to the magnetic attraction force, both ends of the movable yoke 20 are urged toward the first side projection 14A and the second side projection 14B, respectively, along the X-direction. A configuration in which the permanent magnet 60 is provided on the stator yoke 10, and the first excitation coil 30A and the second excitation coil 30B are provided on the movable yoke 20, may also be employed.

When providing a tactile feedback to a user, the controller 180 drives the actuator 140, so that a direction of a current flowing through each of the first excitation coil 30A and the second excitation coil 30B is alternately reversed. In other words, the controller 180 alternately reverses the direction of the current flowing through each of the first excitation coil 30A and the second excitation coil 30B, to alternately invert a magnetic pole at a surface of the first iron core 13A on a side facing the movable yoke 20, and a magnetic pole at a surface of the second iron core 13B on a side facing the movable yoke 20, independently of each other. As a result, the permanent magnet 60 and the movable yoke 20 undergo a reciprocating motion in the X-direction or the Z-direction, according to the direction of the current flowing through the first excitation coil 30A and the direction of the current flowing through the second excitation coil 30B. A relationship between the direction of the current and the direction of motion will be described later.

For example, the first rubber 40A and the second rubber 40B have a rectangular planar shape having a longitudinal direction thereof along the Y-direction. The first rubber 40A is sandwiched between the first side projection 14A and the movable yoke 20, and the second rubber 40B is sandwiched between the second side projection 14B and the movable yoke 20. In other words, the first rubber 40A and the second rubber 40B are sandwiched between the stator yoke 10 and the movable yoke 20. For this reason, unless intentionally disassembled, the first rubber 40A and the second rubber 40B are held between the stator yoke 10 and the movable yoke 20. The first rubber 40A may be fixed to the upper surface of the first side projection 14A, to the lower surface of the movable yoke 20, or to both the upper surface of the first side projection 14A and the lower surface of the movable yoke 20. The second rubber 40B may be fixed to the upper surface of the second side projection 14B, to the lower surface of the movable yoke 20, or to both the upper surface of the second side projection 14B and the lower surface of the movable yoke 20.

The stator yoke 10 is attached to the movable part including the holder 120 (refer to FIG. 2) and the touchpad 130 (refer to FIG. 2), and more particularly, attached to the lower surface 121B (refer to FIG. 2) of the base part 121 of the holder 120. The movable yoke 20 is not attached to the holder 120 (refer to FIG. 2) nor the touchpad 130 (refer to FIG. 2). The movable yoke 20 is preferably attached to a position overlapping a center of gravity of the movable part within a plane perpendicular to the Z-direction, so as to more uniformly generate the vibration.

Next, the relationship between the direction of the current and the direction of motion will be described. There are, in total, four kinds of combinations of the direction of the current flowing through the first excitation coil 30A and the direction of the current flowing through the second excitation coil 30B.

In a first combination, the current flows counterclockwise (CCW) through the first excitation coil 30A and the second excitation coil 30B when viewed from the −Z-direction. FIG. 7A is a diagram illustrating the relationship between the direction of current and the direction of motion in the first combination. As illustrated in FIG. 7A, in the first combination, the magnetic pole at the surface of the first iron core 13A on the side facing the movable yoke 20 becomes the N-pole, and the magnetic pole at the surface of the second iron core 13B on the side facing the movable yoke 20 also becomes the N-pole. On the other hand, the magnetic pole at the surfaces of the center projection 12, the first side projection 14A, and the second side projection 14B on the side facing the movable yoke 20 becomes the S-pole. As a result, a repulsion force acts between the center projection 12 and the first region 61, a repulsion force acts between the first iron core 13A and the second region 62, and a repulsion force acts between the second iron core 13B and the third region 63. Accordingly, a force 90D in the −Z-direction acts on the movable yoke 20.

Figure 7B:
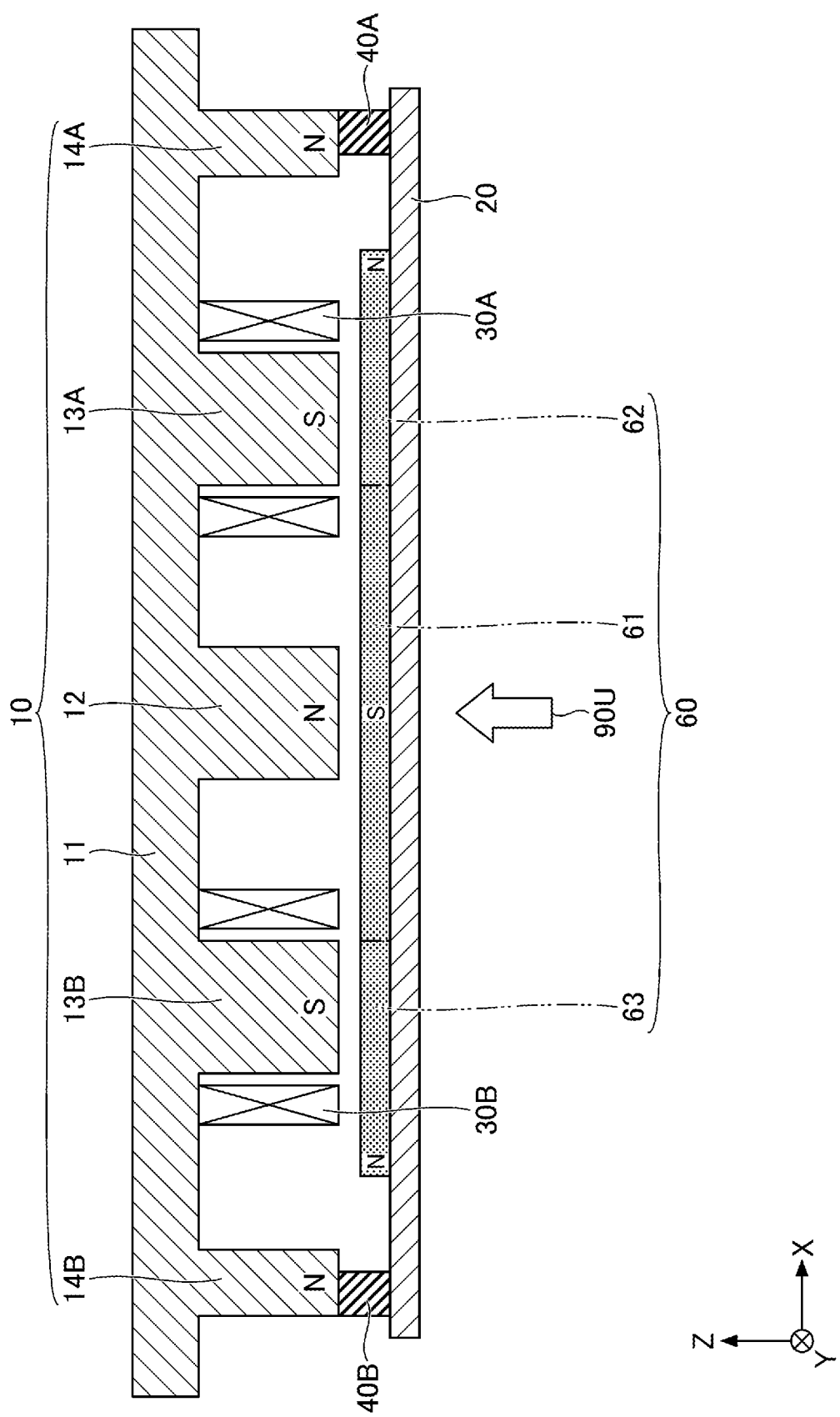
FIG. 7B is a diagram illustrating the relationship between the direction of current and the direction of motion in a second combination.

In a second combination, the current flows clockwise (CW) through the first excitation coil 30A and the second excitation coil 30B when viewed from the −Z-direction. FIG. 7B is a diagram illustrating the relationship between the direction of current and the direction of motion in the second combination. As illustrated in FIG. 7B, in the second combination, the magnetic pole at the surface of the first iron core 13A on the side facing the movable yoke 20 becomes the S-pole, and the magnetic pole at the surface of the second iron core 13B on the side facing the movable yoke 20 also becomes the S-pole. On the other hand, the magnetic pole at the surfaces of the center projection 12, the first side projection 14A, and the second side projection 14B on the side facing the movable yoke 20 becomes the N-pole. As a result, an attraction force acts between the center projection 12 and the first region 61, an attraction force acts between the first iron core 13A and the second region 62, and an attraction force acts between the second iron core 13B and the third region 63. Accordingly, a force 90U in the +Z-direction acts on the movable yoke 20.

Hence, the movable yoke 20 undergoes a reciprocating motion in the Z-direction, by repeating the first combination and the second combination so that the current flows in the same direction through the first excitation coil 30A and the second excitation coil 30B. In other words, by supplying the current to the first excitation coil 30A and the second excitation coil 30B, the movable yoke 20 vibrates in the Z-direction using the position in the initial state as a neutral position. For this reason, the actuator 140 can excite the holder 120 and the touchpad 130 in the Z-direction.

In a third combination, the current flows counterclockwise (CCW) through the first excitation coil 30A, and flows clockwise (CW) through the second excitation coil 30B, when viewed from the −Z-direction. FIG. 7C is a diagram illustrating the relationship between the direction of current and the direction of motion in the third combination. As illustrated in FIG. 7C, in the third combination, the magnetic pole at the surface of the first iron core 13A on the side facing the movable yoke 20 becomes the N-pole, and the magnetic pole at the surface of the second iron core 13B on the side facing the movable yoke 20 becomes the S-pole. The magnetic pole at the surface of the first side projection 14A on the side facing the movable yoke 20 becomes the S-pole, and the magnetic pole at the surface of the second side projection 14B on the side facing the movable yoke 20 becomes the N-pole. As a result, an attraction force acts between the first side projection 14A and the second region 62, an attraction force acts between the first iron core 13A and the first region 61, a repulsion force acts between the second iron core 13B and the first region 61, and a repulsion force acts between the second side projection 14B and the third region 63. Accordingly, a force 90R in the +X-direction acts on the movable yoke 20.

In a fourth combination, the current flows clockwise (CW) through the first excitation coil 30A, and flows counterclockwise (CCW) through the second excitation coil 30B, when viewed from the −Z-direction. FIG. 7D is a diagram illustrating the relationship between the direction of current and the direction of motion in the fourth combination. As illustrated in FIG. 7D, in the fourth combination, the magnetic pole at the surface of the first iron core 13A on the side facing the movable yoke 20 becomes the S-pole, and the magnetic pole at the surface of the second iron core 13B on the side facing the movable yoke 20 becomes the N-pole. The magnetic pole at the surface of the first side projection 14A on the side facing the movable yoke 20 becomes the N-pole, and the magnetic pole at the surface of the second side projection 14B on the side facing the movable yoke 20 becomes the S-pole. As a result, a repulsion force acts between the first side projection 14A and the second region 62, a repulsion force acts between the first iron core 13A and the first region 61, an attraction force acts between the second iron core 13B and the first region 61, and an attraction force acts between the second side projection 14B and the third region 63. Accordingly, a force 90L in the −X-direction acts on the movable yoke 20.

Hence, the movable yoke 20 undergoes a reciprocating motion in the X-direction by repeating the third combination and the fourth combination, so that the current in the reverse direction flows through the first excitation coil 30A and the second excitation coil 30B. In other words, by supplying the current to the first excitation coil 30A and the second excitation coil 30B, the movable yoke 20 vibrates in the X-direction using the position in the initial state as the neutral position. For this reason, the actuator 140 can excite the holder 120 and the touchpad 130 in the X-direction.

Figure 8:
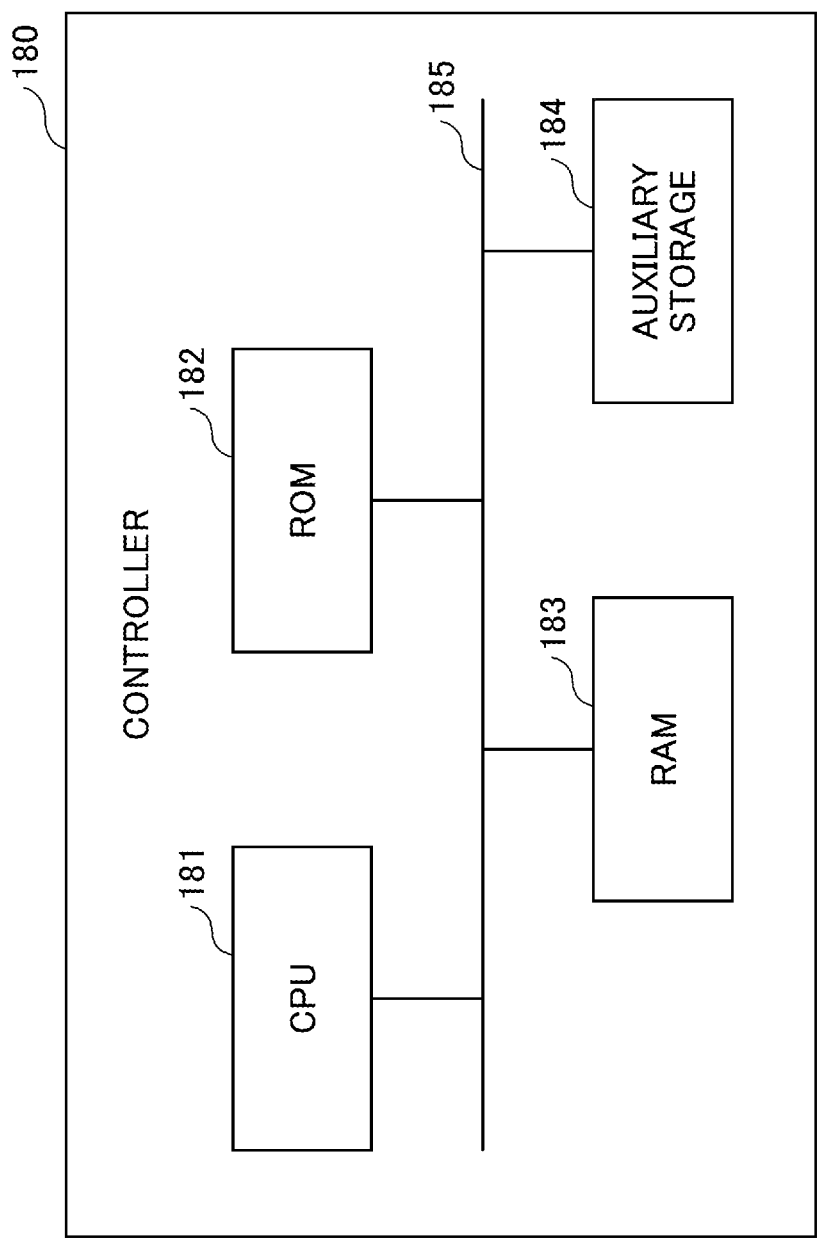
FIG. 8 is a diagram illustrating a configuration of a controller 180.

Next, the driving of the actuator 140 by the controller 180 will be described. The controller 180 is an example of a controller that determines whether a load applied to the operating position of the touchpad 130 reached a reference value for generating a tactile feedback, and drives the actuator 140 according to the determination result so as to generate the tactile feedback. The controller 180 is provided on the bottom surface 111A in this embodiment (refer to FIG. 2), but the location where the controller 180 is provided is not limited, and the controller 180 may be provided at a position between the touchpad 130 and the holder 120, for example, or the like. FIG. 8 is a diagram illustrating a configuration of the controller 180.

The controller 180 includes a Central Processing Unit (CPU) 181, a Read Only Memory (ROM) 182, a Random Access Memory (RAM) 183, and auxiliary storage 184. The CPU 181, the ROM 182, the RAM 183, and the auxiliary storage 184 foam a so-called computer. Parts of the controller 180 are interconnected via a bus 185.

The CPU 181 executes various programs (for example, a load determination program) stored in the auxiliary storage 184.

ROM 182 is a non-volatile main storage device. The ROM 182 stores various programs, data, or the like required by the CPU 181 to execute the various programs stored in the auxiliary storage 184. More particularly, the ROM 182 stores boot programs, such as a Basic Input/Output System (BIOS), an Extensible Firmware Interface (EFI), or the like.

The RAM 183 is a volatile main storage device, such as a Dynamic Random Access Memory (DRAM), a Static Random Access Memory (SRAM), or the like. The RAM 183 functions as a work area when the various programs stored in the auxiliary storage 184 are executed by the CPU 181.

The auxiliary storage 184 is an auxiliary storage device that stores various programs executed by the CPU 181, and various data that are generated when the various programs are executed by the CPU 181.

When the pressing operation on the operating surface 130A is detected by the gap sensor 160, the operation device 100 drives the actuator 140 to excite the holder 120 and the touchpad 130 in the X-direction and the Z-direction.

In addition, when vibrating the holder 120 and the touchpad 130 in the X-direction, the actuator 140 causes vibration at a frequency lower than 400 Hz, for example, that facilitates the living body to perceive the tactile sensation. The tactile sensation is presented to the living body through the operating body touching the operating surface 130A, by generating the vibration in the X-direction on the operating surface 130A.

Moreover, when vibrating the holder 120 and the touchpad 130 in the Z-direction, the actuator 140 causes vibration at a frequency higher than or equal to 400 Hz, for example. By vibrating the operating surface 130A in the Z-direction, air surrounding the operating surface 130A vibrates to generate a sound, thereby presenting the sound to the living body. The operation device according to this embodiment generates the sound having a predetermined frequency (in this example, 400 Hz) or higher, among sounds in a frequency band (approximately 20 kHz or lower) of an audible range of the human being.

The frequency band of the vibration for providing the tactile sensation to the living body may be lower than the frequency band of the vibration for presenting the sound. In this case, when simulating the tactile sensation and sound of operating a mechanical switch, for example, by the operation device 100, it is possible to provide a natural operation feeling to the operator. In addition, it is possible to reduce an interference that occurs when timings of the two vibrations are close to each other.

In a case where the frequency band of the vibration for presenting the sound overlaps the frequency band of the vibration for providing the tactile sensation to the living body, the vibration for presenting the sounds may also provide the tactile sensation to the living body, and for this reason, the tactile sensation may be provided as if the mechanical switch were clicked twice, for example. By making the frequency band of the vibration for presenting the sound higher than the frequency band of the vibration for providing the tactile sensation to the living body, it is possible to reduce the tactile sensation from being presented to the living body by the vibration for presenting the sound.

When the holder 120 and the touchpad 130 are vibrated in any direction, a sound is generated due to a distortion caused by the vibration, unless the holder 120 and the touchpad 130 are perfectly rigid bodies. However, because the vibration of the holder 120 and touchpad 130 includes the vibration having the frequency optimized for presenting the tactile sensation to the living body, the sound generated by this vibration may not necessarily be the sound to be desirably presented to the living body.

A position of an ear of the living body performing the contact operation on the operating surface 130A is at least separated from the operating surface in the Z-direction, and the position of the ear of the living body is unlikely separated from the operating surface 130A only in the X-direction.

For this reason, when the vibration in the X-direction of the holder 120 and the touchpad 130 is used to provide the tactile sensation to the living body, it is possible to provide only the tactile sensation to the living body, and reduce the sound output from the operating surface 130A in the X-direction from being presented to the living body due to the vibration in the X-direction. Because the sound output in the X-direction does not easily reach the ear of the living body positioned in the Z-direction from the operating surface 130A, and the vibration in the X-direction vibrates an amount of air smaller than the vibration in the Z-direction, thereby making a volume of the generated sound extremely small, it is possible to reduce the sound output in the X-direction from the operating surface 130A and presented to the living body.

In addition, the vibration in the Z-direction of the holder 120 and touchpad 130 is suitable for use in presenting the sound to the living body. By vibrating the operating surface 130A in the Z-direction so as to function like a speaker, it is possible to output the sound in the Z-direction from the operating surface 130A. Because the position of the ear of the living body making the contact operation on the operating surface 130A is separated at least in the Z-direction from the operating surface 130A, it is possible to present the sound output from the operating surface 130A in the Z-direction to the living body.

Accordingly, the operation device 100 according to the present embodiment presents the tactile sensation to the living body through the operating body making contact with the operating surface 130A, by generating the vibration in the X-direction on the operating surface 130A, and presents the sound to the living body, by vibrating the operating surface 130A in the Z-direction.

The operation device 100 may simultaneously generate the vibration in the X-direction and the vibration in the Z-direction on the operating surface 130A, however, the vibration in the Z-direction may be generated after a predetermined time elapses from a time when the vibration in the X-direction is generated. Hence, it is possible to reduce generation of noise caused by the mutual interference between the vibration in the X-direction and the vibration in the Z-direction. More particularly, the operation device 100 preferably generates the vibration in the X-direction, and generates the vibration in the Z-direction after the vibration in the X-direction essentially converges.

Figure 9:
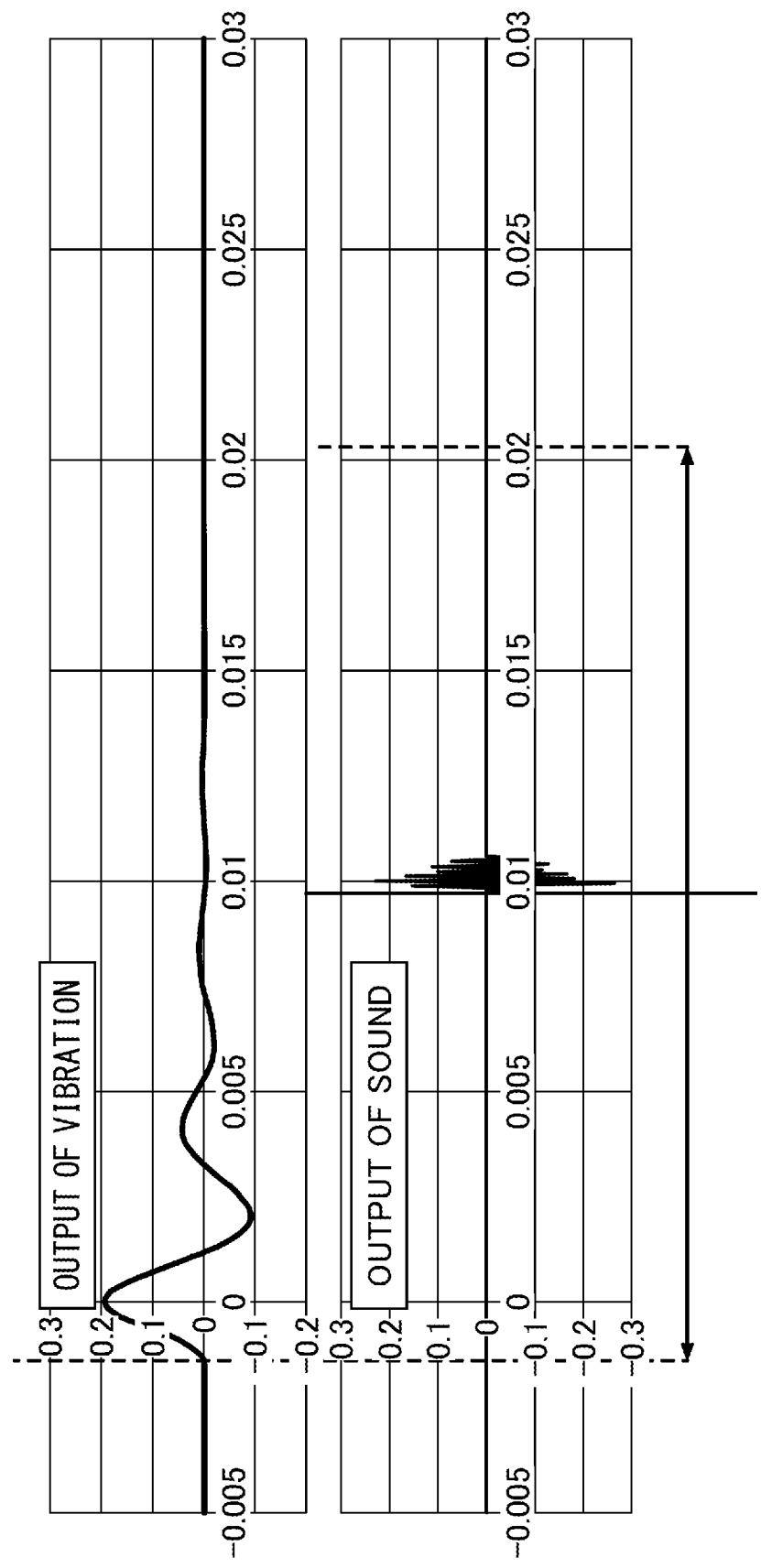
FIG. 9 is a diagram illustrating timings of vibration output and sound output.

FIG. 9 is a diagram illustrating timings of vibration output and sound output. In FIG. 9, the abscissa indicates a time base, and the ordinate indicates levels of the vibration and the sound. As illustrated in FIG. 9, the vibration in the X-direction is generated at a time of 0 second, and after the vibration in the X-direction converges in approximately 0.009 second, the vibration in the Z-direction is started at a time of 0.01 second to output the sound. The vibration in the Z-direction for outputting the sound is generated for approximately 0.0015 second.

Accordingly, the vibration in the Z-direction is preferably started at a timing delayed by approximately several milliseconds to several tens of milliseconds with respect to the vibration in the X-direction. In a case of the human being having an average build, a difference between the time it takes for the tactile sensation felt by a fingertip to be transmitted to a brain through nerves in the body, and the time it takes for the sound entering the ear to be transmitted to the brain, is approximately 5 milliseconds to approximately 30 milliseconds, when a length of the nerves from the fingertip to the brain is 85 cm, for example. Hence, the tactile sensation and the sound can be presented simultaneously to the living body, by utilizing the above described timings of the vibrations.

Figure 10:
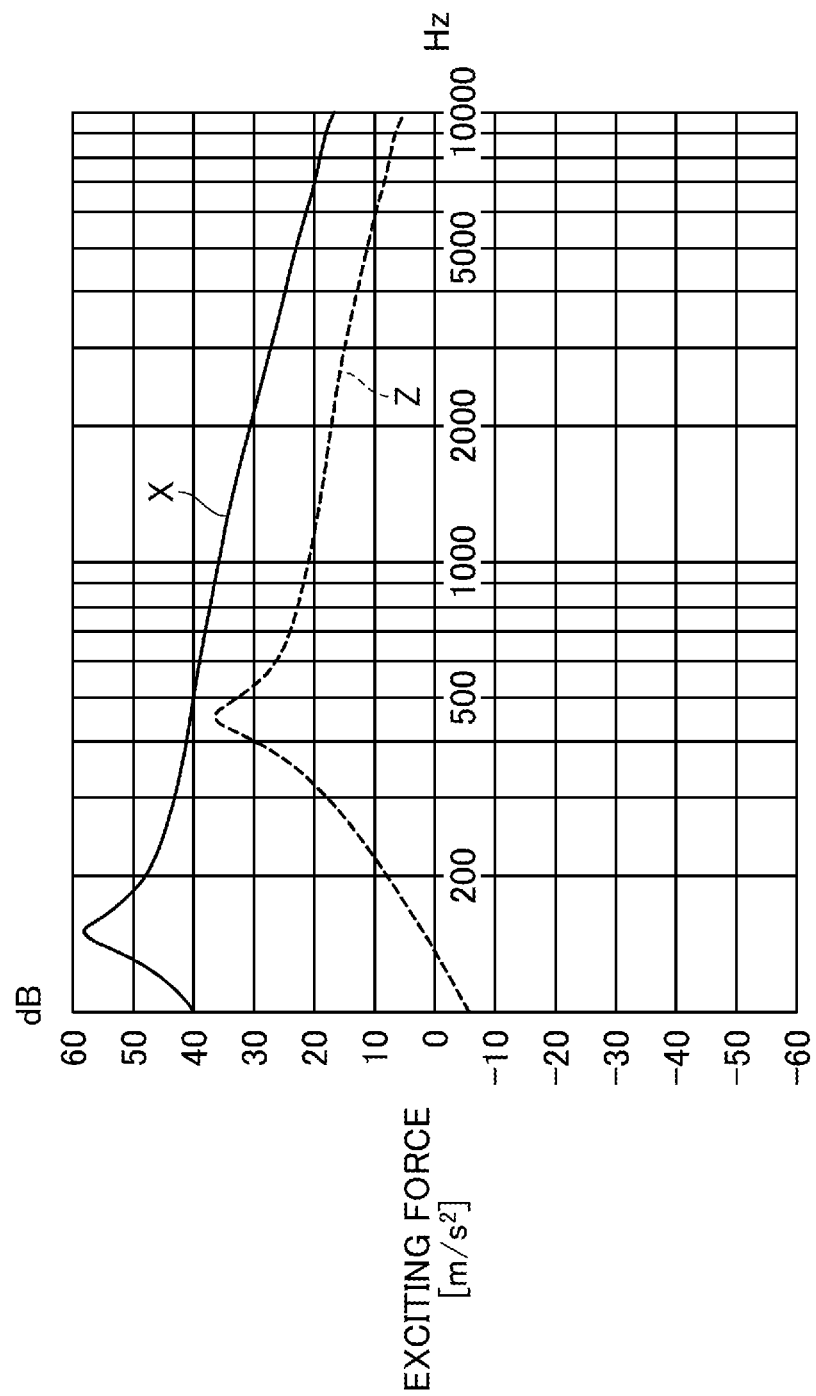
FIG. 10 is a diagram illustrating an example of a frequency characteristic of an exciting force of the actuator 140.

FIG. 10 is a diagram illustrating an example of a frequency characteristic of an exciting force of the actuator 140. In FIG. 10, the abscissa indicates the frequency (Hz), and the ordinate indicates the exciting force ($m/s^2$). The characteristic indicated by a solid line represents the frequency characteristic of the exciting force when exciting in the X-direction, and the characteristic indicated by a dashed line represents the frequency characteristic of the exciting force when exciting in the Z-direction.

The exciting force in the X-direction has a peak (resonance frequency) at approximately 130 Hz, and the exciting force in the Z-direction has a peak (resonance frequency) at approximately 450 Hz.

For this reason, in the actuator 140 of this example, the resonance frequency of the vibration in the X-direction is lower than 400 Hz, and thus, it is easy to cause vibration at a vibration frequency lower than 400 Hz when exciting the holder 120 and the touchpad 130 in the X-direction. In addition, in the actuator 140 of this example, the resonance frequency of the vibration in the Z-direction is higher than or equal to 400 Hz, and hence, it is easy to cause vibration at a vibration frequency higher than or equal to 400 Hz when exciting the holder 120 and the touchpad 130 in the Z-direction.

As described above, by using the actuator 140 that can cause excitation in the X-direction and the Z-direction, the holder 120 and the touchpad 130 can be excited in the X-direction to provide the tactile sensation, while reducing the generation of sound caused by the vibration, and the holder 120 and the touchpad 130 can be excited in the Z-direction to present the sound.

Both the tactile sensation and the sound are presented directly from the operating surface 130A of the touchpad 130. In addition, the frequency at which the actuator 140 excites the holder 120 and the touchpad 130 to present the tactile sensation, and the frequency at which the actuator 140 excites the holder 120 and the touchpad 130 to present the sound, can be adjusted separately, and can be optimized according to the tactile sensation and sound to be simulated. For this reason, it is possible to coordinate the tactile sensation and the sound presented with respect to the pressing operation.

Accordingly, the operation device 100 that provides a natural operation feeling through the tactile sense and the auditory sense, can be provided.

In addition, because the operation device 100 includes the controller 180, the actuator 140 can be controlled to cause excitation in the X-direction and cause excitation in the Z-direction.

Moreover, the controller 180 controls the actuator 140 to cause excitation in the Z-direction at the frequency higher than the frequency at which the actuator 140 causes excitation in the X-direction, so that it is possible to present the sound close to an operation sound of a real device.

Further, the dampers 170A and the dampers 170B, as the elastic supports, elastically support the holder 120, so that the natural frequency in the Z-direction of the holder 120 and the touchpad 130, as the movable parts, is higher than the natural frequency of the movable parts in the X-direction, so that the holder 120 and the touchpad 130 can be efficiently vibrated in the frequency band suitable for presenting the tactile feedback in the X-direction and for presenting the sound in the Z-direction.

On the other hand, because the spring constant in the Z-direction of the damper 170A is larger than the spring constant in the X-direction of the damper 170B, the natural frequency in the X-direction and the Z-direction of the holder 120 and the touchpad 130 can be set to the frequency band suitable for presenting the tactile feedback in the X-direction and for presenting the sound in the Z-direction.

In addition, when the gap sensor 160 detects the pressing operation on the operating surface 130A, the actuator 140 causes excitation in the X-direction and causes excitation in the Z-direction. For this reason, it is possible to reliably detect the pressing operation, and present the tactile sensation and the sound according to the pressing operation.

Moreover, when the pressing operation is detected, the actuator 140 causes excitation in the X-direction, and thereafter causes excitation in the Z-direction. For this reason, it is possible to reduce mixing of the presentation of the tactile sensation and the presentation of the sound, and to reduce the generation of noise, thereby enabling the presentation of excellent tactile sensation and sound.

Further, the dampers 170A are provided between the lower surface 122A of the wall part 122 of the holder 120, and the bottom surface 111A of the base 110, and the dampers 170B are provided between the outer surface 122B of the wall part 122 of the holder 120, and the inner surface 111B of the base 110. For this reason, by setting the spring constants and positions of the dampers 170A and 170B, it is possible to freely adjust the natural frequencies of the holder 120 and the touchpad 130 in the X-direction and the Z-direction.

In addition, because the dampers 170B are disposed between the outer surface 122B and the inner surface 111B in the state elastically deformed in the X-direction, it is possible to restore the holder 120 and the touchpad 130 to the initial positions before being excited, when the excitation of the holder 120 and the touchpad 130 by the actuator 140 ends.

Moreover, because the actuator 140 is separated from the bottom surface 111A of the accommodating part 111 of the base 110, it is possible to reduce the vibration transmitted from the actuator 140 to the base 110.

Further, the actuator 140 includes the stator yoke 10 fixed to the holder 120, the first rubber 40A and the second rubber 40B connected to the stator yoke 10, and the movable yoke 20 connected to the first rubber 40A and the second rubber 40B and selectively vibratable in each of the X-direction and the Z-direction with respect to the stator yoke 10. The stator yoke 10 and the movable yoke 20 have the first excitation coil 30A, the second excitation coil 30B, and the permanent magnet 60, respectively. The movable yoke 20 is vibrated with respect to the stator yoke 10 by magnetic forces between each of the first excitation coil 30A and the second excitation coil 30B, and the permanent magnet 60, generated by supplying currents to the first excitation coil 30A and the second excitation coil 30B, it is possible to cause excitation in two axial directions, namely, the X-direction and the Z-direction, by use of the single actuator 140.

According to the embodiments described above, an operation device can provide a natural operation feeling through the tactile sense and the auditory sense.

Although the embodiments described above uses the touchpad 130, it is possible to use a touchscreen panel capable of transmitting light, in place of the touchpad 130. In this case, a display panel may be laminated on the touchscreen panel, and the pressing operation may be performed on as Graphical User Interface (GUI) which makes a display on the display panel.

In addition, although the embodiments described above presents the tactile sensation and the sound when the pressing operation is performed on the operating surface 130A, the present invention is not limited to such embodiments. For example, the tactile sensation and the sound may be presented when a touch operation is performed on the operating surface 130A, and the tactile sensation and the sound may be presented when a predetermined operation, such as a swipe operation or the like, is performed on the operating surface 130A.

Although examples of the operation device according to the embodiments of the present invention are described heretofore, the present invention is not limited to the specifically disclosed embodiments, and various variations and modifications can be made without departing from the scope of the claims.

What is claimed is:

1. An operation device comprising:
a movable part having an operating surface on which a contact operation is performed by an living body;
a vibration exciter attached to the movable part at a position other than the operating surface, and configured to excite the movable part in a first direction along the operating surface, and in a second direction intersecting the operating surface;
a base part;
an elastic support, provided between the movable part and the base part, and configured to elastically support the movable part with respect to the base part; and
a controller configured to drive the vibration exciter so that the vibration exciter excites the movable part along the first direction to provide a tactile sensation to the living body performing the contact operation, and to drive the vibration exciter so that the vibration exciter excites the movable part along the second direction to generate the sound from the operating surface, wherein the movable part provides a tactile sensation to the living body making the contact operation when excited in the first direction by the vibration exciter, and generates a sound from the operating surface when excited in the second direction by the vibration exciter, the controller is configured to drive the vibration exciter, so as to excite the movable part at a first frequency along the first direction, and to excite the movable part along the second direction at a second frequency higher than the first frequency, and the elastic support elastically supports the movable part so that a second natural frequency of the movable part in the second direction is greater than a first natural frequency of the movable part in the first direction.

2. The operation device as claimed in claim 1, wherein a spring constant of the elastic support in the second direction is greater than a spring constant of the elastic support in the first direction.

3. The operation device as claimed in claim 1, wherein the vibration exciter is separated from the base part.

4. An operation device comprising:
a movable part having an operating surface on which a contact operation is performed by an living body;
a vibration exciter attached to the movable part at a position other than the operating surface, and configured to excite the movable part in a first direction along the operating surface, and in a second direction intersecting the operating surface;
a base part;
an elastic support, provided between the movable part and the base part, and configured to elastically support the movable part with respect to the base part;
a detector configured to detect a pressing operation on the operating surface; and
a controller, wherein
the movable part provides a tactile sensation to the living body making the contact operation when excited in the first direction by the vibration exciter, and generates a sound from the operating surface when excited in the second direction by the vibration exciter, and
the controller drives the vibration exciter to excite the movable part in the first direction, and excite the movable part in the second direction after a predetermined time elapses thereafter, when the pressing operation is detected by the detector.

5. An operation device comprising:
a movable part having an operating surface on which a contact operation is performed by an living body;
a vibration exciter attached to the mole able part at a position other than the operating surface, and configured to excite the movable part in a first direction along the operating surface, and in a second direction intersecting the operating surface;
a base Part; and
an elastic support, provided between the movable part and the base part, and configured to elastically support the movable part with respect to the base part, wherein
the movable part provides a tactile sensation to the living body making the contact operation when excited in the first direction by the vibration exciter, and generates a sound from the operating surface when excited hi the second direction by the vibration exciter,
the base part is located at a position separated from the movable part, at both ends of the movable part along the first direction,
the elastic support includes a first elastic body configured to elastically support the movable part along the first direction, and a second elastic body configured to elastically support the movable part along the second direction, and the first elastic body is disposed in a state elastically deformed between the movable part and the base part, at both ends of the movable part along the first direction.

6. An operation device comprising:
a movable part having an operating surface on which a contact operation is performed by an living body;
a vibration exciter attached to the movable part at a position other than the operating surface, and configured to excite the movable part in a first direction along the operating surface, and in a second direction intersecting the operating surface;
a base part; and
an elastic support, provided between the movable part and the base part, and configured to elastically support the movable part with respect to the base part, wherein
the movable part provides a tactile sensation to the living body making the contact operation when excited in the first direction by the vibration exciter, and generates a sound from the operating surface when excited in the second direction by the vibration exciter,
the vibration exciter includes a stator body fixed to the movable part, an elastic body connected to the stator body, and a vibrating body connected to the elastic body, and selectively vibratable in the first direction and the second direction with respect to the stator body, and
one of the stator body and the vibrating body has a coil, and the other has a magnet, and the vibrating body vibrates with respect to the stator body by a magnetic force generated between the coil and the magnet when a current is supplied to the coil.

7. An operation device comprising:
a movable part having an operating surface on which a contact operation is performed by an living body;
a vibration exciter attached to the movable part, at a position other than the operating surface, and configured to excite the movable part in a first direction along the operating surface, and in a second direction intersecting the operating surface;
a base part; and
an elastic support, provided between the movable part and the base part, and configured to elastically support the movable part with respect to the base part, wherein
the movable part provides a tactile sensation to the living body making the contact operation when excited in the first direction by the vibration exciter, and generates a sound from the operating surface when excited in the second direction by the vibration exciter,
the vibration exciter includes
a first yoke,
a second yoke disposed to oppose the first yoke in a third direction,
a permanent magnet attached to a surface of the first yoke on a side facing the second yoke, and
a first excitation coil and a second excitation coil attached to the second yoke and generating a magnetic flux when supplied with a current,
the second yoke includes
a base, and
a first projection projecting from the base toward the first yoke, between the first excitation coil and the Second excitation coil,
the first excitation coil and the second excitation coil are disposed to sandwich the first projection in a fourth direction perpendicular to the third direction, axial directions of the first excitation coil and the second excitation coil are parallel to the third direction,
the permanent magnet includes
a first region,
a second region located on one side of the first region in the fourth direction, and
a third region located on the other side of the first region in the fourth direction,
the first region is magnetized to become a first magnetic pole,
the second region and the third region are magnetized to become second magnetic poles,
the first region opposes the first projection,
a boundary between the first region and the second region opposes the first excitation coil, and
a boundary between the first region and the third region opposes the second excitation coil.

8. An operation device comprising:
a movable part having an operating surface on which a contact operation is performed by an living body;
a vibration exciter attached to the movable part at a position other than the operating surface, and configured to excite the movable part in a first direction along the operating surface, and in a second direction intersecting the operating surface;
a base part; and
an elastic support, provided between the movable part and the base part, and configured to elastically support the movable part with respect to the base part, wherein
the movable part provides a tactile sensation to the living body making the contact of when excited in the first direction by the vibration exciter, and generates a sound from the operating surface when excited in the second direction by the vibration exciter, and
a resonance frequency of a vibration along the first direction of the vibration exciter is lower than 400 Hz, and a resonance frequency of a vibration along the second direction of the vibration exciter is higher than or equal to 400 Hz.

* * * * *